Patented June 28, 1938

2,122,125

UNITED STATES PATENT OFFICE 2,122,125

WATER-SOLUBLE CONDENSATION PRODUCTS AND A PROCESS OF PRODUCING SAME

Richard Alles, Mannheim, Germany, assignor to I. G. Farbenindustrie Aktiengesellschaft, Frankfort-on-the-Main, Germany No Drawing. Application February 3, 1937, Serial No. 123,865

12 Claims. (Cl. 149—5)

The present invention relates to new water-soluble condensation products and a process of producing same.

In my co-pending application Serial No. 121,822 I have described that water-soluble condensation products having good tanning action are obtained by treating lignin sulphonic acid and hydroxy compounds of the benzene series together with the addition compounds of salts of sulphurous acid and aldehydes or ketones or their derivatives, such as aldehyde or ketone alcohols or acids, in alkaline media preferably in the presence of an excess of the aldehydes or ketones.

I have now found that especially valuable water-soluble condensation products are obtained if instead of lignin sulphonic acid other cyclic sulphonic acids containing hydroxyl groups, preferably aromatic sulphonic acids containing hydroxyl directly attached to an aromatic nucleus, are employed. The cyclic sulphonic acids containing hydroxyl groups may contain one or several sulphonic acid groups which may be directly attached to a nucleus and/or to an aliphatic side-chain. Suitable sulphonic acids are for example the sulphonic acids of phenols, for example phenol or cresol sulphonic acids or their derivatives, substitution products or condensation products with low molecular aldehydes, ketones, acetylene or sulphur; the sulphonic acids of condensation products may be obtained by sulphonating condensation products or by condensing sulphonic acids or by simultaneous condensation and introduction of sulphonic acid groups. Suitable sulphonic acids of condensation products are for example the disulphonic acid of di-(para-hydroxyphenyl-)dimethylmethane and the sulphonic acids obtainable by the addition of formaldehyde-bisulphite on dihydroxydiarylmethanes (such as di-(hydroxyphenyl)-dimethlymethane) or on phenol-acetaldehyde resins. The sulphonation products of the resinic residues from the purification of cresol and the sulphonation products of phenol-acetylene resins are also suitable. As condensation products of sulphonic acids with low molecular aldehydes or ketones there may be mentioned for example the condensation product from cresol sulphonic acid and formaldehyde and analogous products. Sulphonic acids derived from humic acids of any kind may also serve as initial materials. For example the naturally occurring products consisting of or containing humic substances, especially fossil materials such as lignite rich in humic acids, peat and the like and humic acids contained therein (obtainable therefrom for example by extraction with solutions of alkaline substances) may serve for the preparation of sulphonic acids to be used according to the present invention. The said humic acids may be converted into sulphonic acids for example according to the process described in the German Patent 443,339, for example by treatment with formaldehyde-bisulphite.

As hydroxy compounds of the benzene series etc. and as addition compounds of salts of sulphurous acid and aldehydes or ketones etc. the same compounds as described in the said application Ser. No. 121,822 may be used and the process may be carried out in an analogous manner as described therein.

The different initial components may be brought into reaction with one another simultaneously or in any desired sequence. Instead of single compounds of the different classes of substances mixtures of different compounds of the said classes may also be employed. The proportions of the components may vary within wide limits. The condensation is preferably carried out at between 90° and 100° C.; it may, however, also be effected at lower or higher temperature and, if desired, under pressure.

It is advantageous to cause the components to react with one another in media rendered alkaline by means of calcium hydroxide or barium hydroxide; by precipitation of the calcium or barium and removing the precipitate by filtration products are obtained which have a low ash content and may be adjusted to the most favorable pH value for tanning purposes by the addition of suitable substances, for example ammonium formate, acetate or glycollate. Usually the optimum pH value of the new tanning agents is above 3, i. e. in the range of the pH values of natural vegetable tanning agents. After the termination of the condensation it is often advantageous to acidify the products with organic or weak inorganic acids; this is especially advantageous if the condensation has been carried out in media rendered alkaline by means of alkali metal hydroxides.

The new condensation products have excellent tanning properties; they possess high astringency and good filling power. Leathers of good rendment are obtained by means of the new condensation products which depend on the particular components selected, their proportions and condensation conditions may be employed for producing different kinds of leather, such as bottom leather and upper leather. On account of their specific tanning properties and their range of pH values they are capable of replacing to a great extent vegetable tanning agents.

The following examples will further illustrate the nature of this invention but the invention is not restricted to these examples. The parts are by weight.

*Example 1*

100 parts of cresol sulphonic acid neutralized with caustic soda solution, 40 parts of cresol, 100 parts of water and 1 part of caustic soda solution of 36° Bé. strength are heated for from 3 to 4 hours under reflux at from 95° to 100° C. together with a solution of 5 parts of sodium bisulphite powder in 50 parts of 30 per cent formaldehyde, preferably while repeatedly or continuously stirring or shaking. The reaction product obtained is acidified with from 10 to 15 parts of 100 per cent formic acid or 20 to 30 parts of 70 per cent glycollic acid. The product is suitable for preparing light leather.

*Example 2*

To a mixture of 148 parts of a formaldehyde-cresolsulphonic acid-condensation product neutralized with calcium hydroxide or calcium carbonate, 70 parts of cresol U. S. P., 50 parts of 30 per cent formaldehyde and 20 parts of sodium bisulphite powder, milk of lime is added until the mixture reacts distinctly alkaline. Then the mass is heated under the conditions described in Example 1. By means of a mixture of sulphuric acid and ammonium sulphate the calcium present is precipitated as calcium sulphate. After filtering off the latter the solution is adjusted to a pH value of about 3.5 by the addition of ammonia. The product obtained is suitable for the production of light leather.

*Example 3*

A mixture of 100 parts of the sodium salt of the sulphonic acid obtainable by condensing dihydroxy-diphenylsulphone with formaldehyde-bisulphite, 200 parts of water, 70 parts of cresol, 70 parts of 30 per cent formaldehyde, 20 parts of sodium bisulphite powder and 1 part of caustic soda solution of 36° Bé. strength is heated for 3 hours under reflux at 95° to 100° C. After acidifying with 10 parts of 100 per cent formic acid the product is suitable for tanning hides.

*Example 4*

A mixture of 100 parts of a condensation product of para-phenol sulphonic acid and acetone, 200 parts of water, 30 parts of cresol, 25 parts of 30 per cent formaldehyde, 5 parts of sodium bisulphite powder and 1 part of caustic soda solution of 36° Bé. strength is heated under reflux at 95° to 100° C. while repeatedly shaking or stirring. The reaction mixture is acidified with 10 parts of 100 per cent formic acid.

*Example 5*

A mixture of 148 parts of a formaldehyde-cresol sulphonic acid-condensation product neutralized with caustic soda solution, 150 parts of water, 74 parts of di-(para-hydroxyphenyl)-dimethylmethane, 70 parts of 30 per cent formaldehyde, 20 parts of sodium bisulphite powder and 1 part of caustic soda solution of 36° Bé. strength is heated for 4 hours at 95° to 100° C. while stirring. After acidification with 10 parts of 100 per cent formic acid the reaction product is suitable for tanning hides.

*Example 6*

148 parts of a formaldehyde-cresol sulphonic acid-condensation product neutralized with magnesium oxide are heated together with 40 parts of cresol, 150 parts of water and 1 part of caustic soda solution of 36° Bé. strength for 1 hour under reflux at 95° C. A solution of 25 parts of aldol and 5 parts of sodium bisulphite powder in 15 parts of water is then added and the mass heated for another 3 hours while shaking or stirring. After acidification with 10 parts of 100 per cent formic acid the product is suitable for producing harness leather, leather for straps or belts and the like.

What I claim is:—

1. The process of producing water-soluble condensation products having good tanning action, which comprises treating in an alkaline medium a cyclic sulphonic acid containing at least one hydroxyl group other than lignin sulphonic acid and a hydroxy compound of the benzene series together with an addition compound of a salt of sulphurous acid and a carbonyl compound selected from the class consisting of the aldehydes, ketones, aldehyde alcohols, ketone alcohols, aldehyde acids and ketone acids.

2. The process of producing water-soluble condensation products having good tanning action, which comprises treating in an alkaline medium an aromatic sulphonic acid containing at least one hydroxyl group directly attached to an aromatic nucleus other than lignin sulphonic acid and a hydroxy compound of the benzene series together with an addition compound of a salt of sulphurous acid and a carbonyl compound selected from the class consisting of the aldehydes, ketones, aldehyde alcohols, ketone alcohols, aldehyde acids and ketone acids.

3. The process of producing water-soluble condensation products having good tanning action, which comprises treating in an alkaline medium a phenol sulphonic acid and a hydroxy compound of the benzene series together with an addition compound of a salt of sulphurous acid and a carbonyl compound selected from the class consisting of the aldehydes, ketones, aldehyde alcohols, ketone alcohols, aldehyde acids and ketone acids.

4. The process of producing water-soluble condensation products having good tanning action, which comprises treating in an alkaline medium a sulphonic acid of a condensation product containing at least one hydroxyl group and a hydroxy compound of the benzene series together with an addition compound of a salt of sulphurous acid and a carbonyl compound selected from the class consisting of the aldehydes, ketones, aldehyde alcohols, ketone alcohols, aldehyde acids and ketone acids.

5. The process of producing water-soluble condensation products having good tanning action, which comprises treating in an alkaline medium a cyclic sulphonic acid containing one hydroxyl group other than lignin sulphonic acid and a hydroxy compound of the benzene series together with an addition compound of a salt of sulphurous acid and formaldehyde.

6. The process of producing water-soluble condensation products having good tanning action, which comprises treating in an alkaline medium an aromatic sulphonic acid containing at least one hydroxyl group directly attached to an aromatic nucleus other than lignin sulphonic acid and a hydroxy compound of the benzene series together with an addition compound of a salt of sulphurous acid and formaldehyde.

7. The products obtainable according to the process claimed in claim 1.

8. The products obtainable according to the process claimed in claim 2.

9. The products obtainable according to the process claimed in claim 3.

10. The products obtainable according to the process claimed in claim 4.

11. The products obtainable according to the process claimed in claim 5.

12. The products obtainable according to the process claimed in claim 6.

RICHARD ALLES.